March 24, 1931. W. A. DARRAH Re. 18,005
PROCESS OF AUTOMATICALLY MEASURING AND APPARATUS THEREFOR
Original Filed Oct. 29, 1928 2 Sheets-Sheet 1
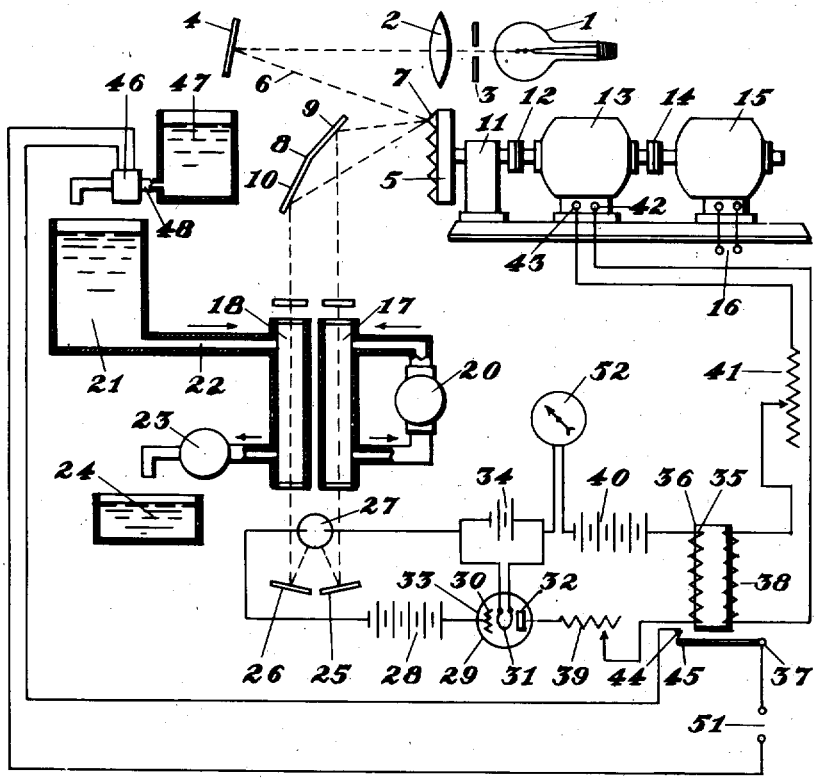
FIGURE I
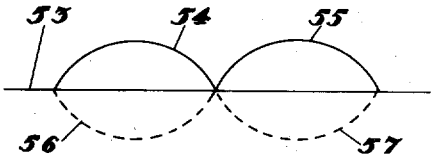
FIGURE III
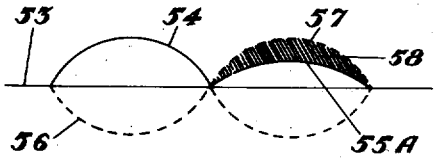
FIGURE IIII
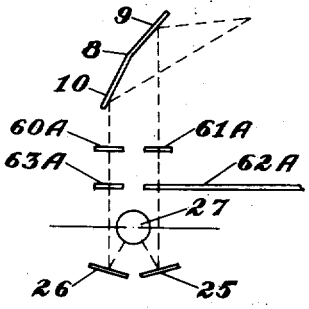
FIGURE II
William A. Darrah
INVENTOR March 24, 1931. W. A. DARRAH Re. 18,005
PROCESS OF AUTOMATICALLY MEASURING AND APPARATUS THEREFOR
Original Filed Oct. 29, 1928 2 Sheets-Sheet 2
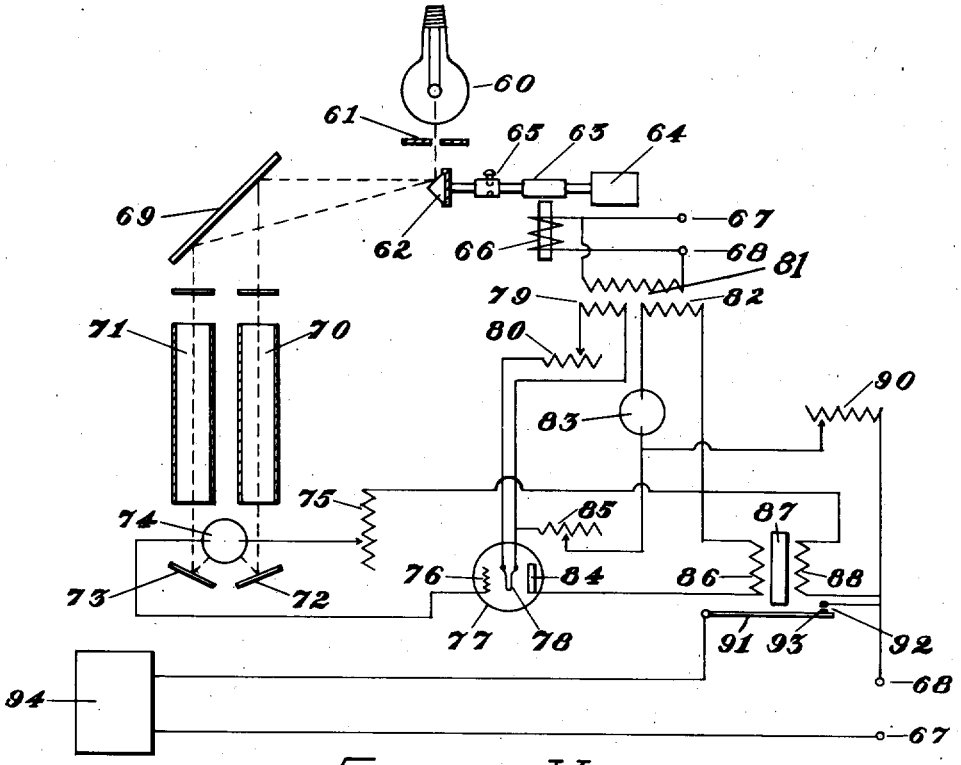
FIGURE V
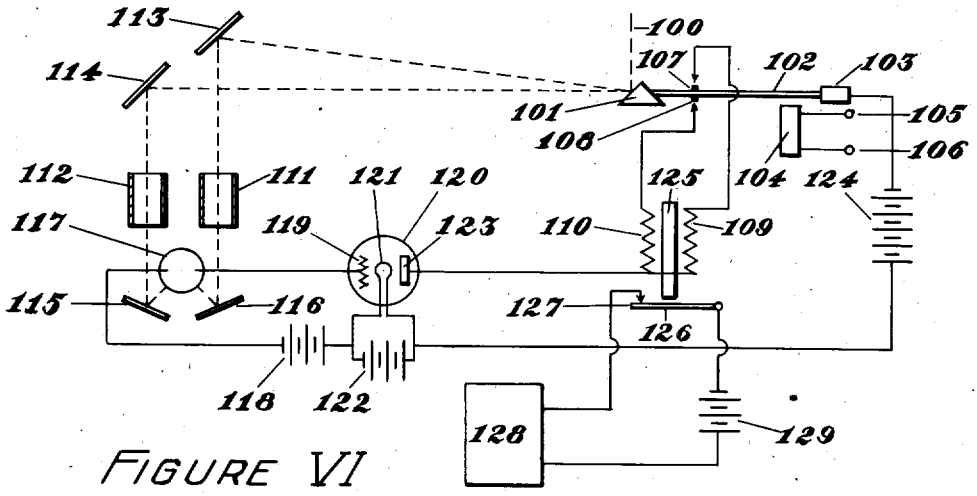
FIGURE VI
William A. Darrah
INVENTOR Reissued Mar. 24, 1931 Re. 18,005

UNITED STATES PATENT OFFICE

WILLIAM A. DARRAH, OF CHICAGO, ILLINOIS

PROCESS OF AUTOMATICALLY MEASURING AND APPARATUS THEREFOR

Original No. 1,746,525, dated February 11, 1930, Serial No. 315,886, filed October 29, 1928. Application for reissue filed December 26, 1930. Serial No. 505,058.

This invention relates to equipment and methods for automatically measuring differences in light transmission. Among the objects of this invention are to provide economical, simple and quick responding means for controlling various processes and operations by means of the transparency of certain products which takes place in the operation.

For example one application of this invention is the control of combustion in order to obtain smokeless combustion, by the absorption of light through a given column of furnace gases. Another application of this process and equipment is in connection with the filtering or bleaching of solutions such as for example sugar or syrup solutions and for instance during the refining operation.

Another application is in the difference of materials such as dyes for the addition of indicators to solutions, the change in light transmission of the solution serving to operate an indicator as well as a control.

Another application of this device is the measurement of the thickness of a sheet of material such as paper by the absorption of light of a sheet of different thicknesses. This process may also be employed in the application of coatings where the thickness of the coating is controlled by its power to restrict the passage of light through the coating.

This equipment may also be employed in such operations as the control of density of a suspended material such as wood pulp in a solution.

The equipment has the advantage of giving an accurate immediate response to variations in light conductivity of gases, liquids, solids or dispersions and of permitting such variations in light transmission to operate control means for maintaining any desired constant condition.

The equipment is relatively inexpensive, sensitive and may be installed without damaging in any manner the product which is being controlled.

Other objects will be apparent from a consideration of the drawings, specification and claims attached hereto.

Referring to the drawings, Figure 1 shows a diagrammatic view of one form of the equipment which constitutes my invention adapted to control a liquid or gaseous medium;

Figure 2 shows diagrammatically a portion of the equipment modified to control such a factor as the thickness of a sheet of paper during its manufacture;

Figure 3 shows the relative electrical characteristics occurring during the operation of my equipment in case of a balance, while Figure 4 shows the electrical conditions existing in my equipment in cases of unbalanced or when the control equipment is functioning;

Figures 5 and 6 show modified arrangements of the apparatus for accomplishing the results set forth.

Referring to Figure 1, 1 represents a source of light for example an ordinary incandescent light preferably of high intensity. The bulb of lamp 1 may be colored to obtain any desired grouping of wave lengths which is most satisfactory for the measurements in hand. Ordinarily the shorter wave lengths are desirable and in many cases it is an advantage to use for the source of light 1 a mercury arc lamp in a quartz or glass tube. 2 indicates a lens or concentrating device which if desired may be omitted or may be replaced by a slotted screen which is shown also as 3. 4 indicates a mirror which receives the light from source and reflects it to rotating device 5. It will be understood that the object of this equipment is to throw a uniform beam of light intermittently through a substance to be tested or controlled and a standard or comparison substance. I, therefore, do not wish to be confined to any set method of accomplishing this result and the equipment indicated here is shown for purposes of clearness and ease of description many changes being obviously possible and still falling within the scope of this invention.

Rotating member 5 carries a series of mirrors or reflecting members such as prisms, so arranged that as the member 5 rotates the beam of light indicated by 6 which falls on prism member 7 is reflected to mirror 8 alternately to position 9 and position 10 as shown by dotted lines. As rotary member 5 revolves, the light is passed back and forth between the two points indicated. Rotary member 5 is shown carried in bearing 11 and connected by coupling 12 to a generator 13 of the direct current type which in turn is connected by coupling 14 to motor 15 which is supplied with power from any desired source as indicated by 16. In other words, motor 15 drives both generator 13 and rotating member 5 which are rigidly coupled together, thus maintaining a definite phase relation between the curent produced by generator 13 and the travel of the light ray from rotating member 5.

The light rays from mirror 8 travel alternately through container 17 and container 18. For purposes of simplicity and description this equipment will be described as being applied to a liquid, but obvious modifications will make the equipment adaptable to either gases or solids. Container 17 is indicated as a standard or check solution carrying a sample of the liquid of the desired density and transparency while container 18 is intended to carry a continual uniform stream of the liquid whose transparency is being checked. 20 indicates a circulating device such as a pump arranged to maintain the liquid in container 17 in agitation both to prevent the settling of insoluble materials and to eliminate variations due to the agitation of the liquid in container 18.

21 indicates a tank or container holding the material whose transparency is being checked. 22 indicates a duct or pipe taking a sample of the liquid in tank 21 to container 18 for test. 23 indicates another pump or circulating means for returning the sample liquid back to tank 24. If desired, the sample liquid may be allowed to go to waste in which case pump 23 can be neglected.

The light rays after passing alternately through containers 17 and 18 are reflected by means of mirrors 25 and 26 to a photo-electric cell 27. It will be apparent, therefore, that the photo-electric cell 27 is alternately excited by the ray of light first through the sample tube 18 and second through the sample tube 17 thus creating a varying electric current when the rays of light are of unequal photo-electric effect, but no change of current when the rays of light are of equal photo-electric effect. Since the solution to be tested and the standard solution are of the same material varying only in density, a change in density or light absorption of the solution being tested will cause a minute current to flow through photo-electric cell 27 when excited by battery 28.

The current passing through photo-electric cell 27 is amplified in any desired manner principally for the reason that the photo-electric currents at present available are too feeble to successfully operate relays or control equipment.

In Figure 1, I have shown diagrammatically a standard three electrode tube 29 similar to amplifiers now used in connection with radio applications or other high frequency equipment. Obviously, if desired, I may employ any other form of amplifier many of which are well known and form no part of this invention. For purposes of clearness, however, I will describe this equipment as illustrated using a three electrode tube as the amplifying means. Within tube 29 is placed a grid member 30, a filament 31 and a plate 32. The whole equipment is enclosed in a container 33.

Filament 31 is maintained at the desired operating temperature by means of a battery 34. Plate 32 is connected in series with a coil 35 and a relay member having core 36, armature 37 and an opposing coil 38.

Plate 32 is also connected in series with a variable resistance 39 and a battery 40 one terminal of which is connected to filament 31. With the arrangement described, whenever the potential of grid 30 is varied with respect to filament 31 there will be a flow of current between filament 31 and plate 32 in the usual manner, this current being much greater than the change in potential of a grid 30 which is caused by photo-electric cell 27.

Coil 38 is connected in series with a variable resistance 41 and to the terminals 42 and 43 of generator 13.

Armature 37 of the relay operates to close contacts 44 and 45 which serve to actuate electrically operated valve 46 or equivalent mechanism.

Automatic valve 46 is connected to a source of liquid 47 by means of piping 48 and discharges said liquid into tank or container 21 when opened.

In operation it will be apparent that a light ray reflected from the mirrors on rotating member 5 passes alternately through column 18 and column 17 containing respectively the material to be tested and the standard material. It will be apparent therefore that coil 35 is subjected alternately to a current impulse which is proportioned first to the light transmitting power of the material to be tested and second to the light transmitting power of the standard material.

The current impulse proportional to the light transmitting power of the standard performs the dual function of checking the material being tested with a standard and compensating for variables in photo-electric cell 27 and electrical equipment associated therewith, including the source of light 1, as will hereinafter become apparent.

Since, however, generator 13 is so wound and synchronized that an electromotive force is produced in exact synchronism with the travel of the ray of light through the various mediums to be tested, coil 38 will be subjected to a flow of current which will be timed exactly with the flow of current in coil 35 but opposed in direction.

Rheostat 41 and 39 permit adjustment of current flow in coils 35 and 38 such that the effect on core 36 of the current caused by the light ray traveling through sample medium 17, and the current produced by the generator 13, simultaneously will be approximately equal and opposite.

Impedance 41 and impedance 39 can be normally adjusted so that when the ray of light from the moving reflector passes through the standard medium 17 the current flow through coil 35 as a result of the amplified photo electric current from cell 27, would be approximately equal and be opposite the current flow from generator 13 and coil 38. Under these conditions the current which results when the ray of light reaches cell 27 from the medium under test will cause an unbalance between coils 35 and 38 if the current in this case is not substantially equal to the current, which resulted when the ray of light passed through the standard medium. As a result therefore my equipment permits of initial adjustment against a set of standard conditions and makes it possible to choose any set of standards which will thereafter be held automatically.

Under these conditions the effect of the currents flowing in coils 35 and 38 during the interval will balance and the relay will be unaffected.

If now the current produced by the light sensitive cell 27 when the ray of light travels through the tube 18 is appreciably less than the current produced when the light ray travels through the tube 17, the effect of coil 35 and coil 38 on core 36 will unbalance.

Armature 37 of core 36 may be polarized. When the resultant magnetic effect on core 36 due to coils 35 and 38 attracts armature 37, contacts 44 and 45 will be closed thus applying a source of potential 51 to automatically operate the valve 46 thus allowing solution to pass from container 47 into container 21.

It will be apparent therefore that if the opaqueness of the material in tube 18 is greater than that in tube 17, the automatic valve 46 will be actuated causing additional liquid to flow into container 21 thus diluting the material in tube 18, which in turn reduces the opaqueness of this material thus tending to maintain an equilibrium.

An indicating device 52 is shown diagrammatically attached to the circuit, the device serving to give a visual indication of the current flowing through coil 35. Device 52 is preferably constructed in the form of a direct current milliammeter.

An understanding of the operation of this equipment can be readily obtained by considering Figures 3 and 4 respectively. Referring to Figure 3, 53 indicates a base line upon which is drawn the curves shown in solid lines and indicated by 54 and 55, and the reverse curves 56 and 57 respectively.

In Figure 4, 53 indicates the same base line as in Figure 3 and other numbers similar parts as in Figure 3. Referring to Figure 3, it may be assumed that 54 indicates the curve of magnetic effect produced on core 36 by the amplified current from photo-electric cell 27 when actuated by the standard material; while curve 55 indicates the corresponding curve of magnetic effect produced on core 36 by the photo-electric cell 27, when submitted to the light traveling through the material whose opaqueness it is desired to maintain constant.

Curves 56 and 57 represent the magnetizing effect of coil 38 upon core 36 due to the current wave produced by generator 13 and which it will be noted is synchronized but opposite to the magnetic effect produced by the light rays traveling through the tubes 17 and 18.

In Figure 3 it will be noted that curve 54 is equal and opposite to curve 56 and curve 57 is equal and opposite to curve 55 so that there is substantially no resultant magnetic effect upon core 36 and armature 37 is therefore not lifted and automatic valve 46 is not operated.

Referring now to Figure 4, the condition there illustrated shows the standard constant wave produced by generator 13 namely curves 56 and 57, and shows also the standard constant wave produced by light traveling through the standard sample in tube 17, namely curve 54. In this case, however, curve 55A represents the magnetizing effect due to the current generated in photo-electric cell 27 when the light ray travels through the tube 18 containing the medium to be controlled. In this case, it is assumed that the density of medium 18 has increased which would in turn decrease the transmission of light through tube 18 to photo-electric cell 27 and thus materially reduce the current passing through coil 35 as a result of such light action. Since the current passing through coil 35 is materially reduced, the magnetizing effect upon core 36 would also be reduced and this is shown as curve 55A. Since curve 55A is now materially less than curve 57, a balance is not obtained but a marginal magnetizing which is indicated by the shaded area 58 is available to operate the relay lifting armature 50 and thus to cause automatic valve 46 to operate. Obviously operating automatic valve 46 causes the addition of water from container 47 to container 21 thus diluting the mixture in container 21 and therefore diluting the material in sample tube 18. This promptly results in an increased transmission of light through tube 18 with a result that a balance is soon established and the conditions illustrated in Figure 3 again obtained. When this condition occurs, automatic valve 46 which is spring actuated, immediately closes and the addition of water or diluting material to tank 21 from tank 47 ceases.

It will be apparent therefore that the equipment outlined here provides means for automatically diluting a given stock of material to maintain constant light transmission.

Obviously conditions may be exactly reversed and tank 47 may contain for example a supply of dye or opaque material in which case the equipment may be employed to maintain the desired opaqueness.

In the description given above, the equipment is used to maintain a uniform condition of light transmission through a liquid or gaseous material. Illustrations of such conditions would be the maintaining of a constant concentration of wood pulp in solution, or the maintenance of a constant addition of lime to lime water and various other chemicals, dyes, etc.

In Figure 2, a diagrammatic arrangement is shown of a thin solid material such as a strip of paper, cardboard, film, etc. Similar numbers represent similar parts. In Figure 2, 60A and 61A indicate screens which may be interposed in the path of light ray to obtain the desired color, intensity of light balance. 62A indicates a strip of solid material which is being tested and 63A a standard sample of solid material having the desired characteristics, which it is wished to obtain. If 62A is considered to be a strip of paper, leaving a paper forming machine and 63A a standard sample of paper, it will be apparent that by controlling the flow of water from tank 47 (Figure 1) into a stock chest 21, the thickness of the sheet of paper 62A may be controlled in the usual manner known to the trade. The control obtained in this case, however, is automatic instead of manual which is the present practice.

I wish it to be understood that any features shown and described in this specification are to be taken as diagrammatic in being possible to make any substitutions and variations without departing from the spirit of my invention. For example, I may use any desired number of amplifying tubes or I may use other commercial forms of amplifiers. The relay which I have shown may be constructed in any well known forms all of which come in the scope of my invention. Instead of using the photo-electric cell indicated in 27 I may use a piece of light sensitive selenium or other material of this nature although I prefer photo-electric cell of the type indicated.

Various forms of generating equipment may be used as for example, a vibrating type of generator or a vibrated contact in which case of course, the light rays would be synchronized with the vibrations of the generating device. Thus I may use a vibrating electro-magnet carrying a mirror on the moving part in place of the system comprised by rotating member 5, generator 13 and motor 15. In this case I may also use the exciting current of vibrating device in coil 38 after properly controlling it by the variable resistance 41.

I wish to point out that certain important results are accomplished by the general arrangement of equipment which I have here described and claimed. For example, the arrangement which I have disclosed permits the use of a single light source and a single light sensitive cell for comparing two different materials. Such an arrangement overcomes the difficulties which would normally be inherent in a device of this kind due to variations in the amount of light produced as for example, fluctuations in voltage applied to the light, deterioration in the light source, etc. This arrangement also avoids variations due to a change in sensitiveness of photo-electric cell 27. For example if the photo cell becomes more or less responsive, the changed condition affects both the reaction of the cell to the light ray from the test medium and the light ray from the standard. Since both reactions are converted into electrical impulses which are opposed to each other, the larger impulse will control the operation of the relay which will be therefore independent of the sensitivity or related characteristics of the cell, but will be controlled entirely by the relative strength of the light ray from the standard and from the test medium. As contrasted to this condition, the ordinary circuit using a photo-electric cell as a simple light sensitive control will give electrical impulses which vary widely in intensity with the condition and age of the cell, the impressed voltage on the cell and light source and many other factors. Obviously, the arrangement which I have disclosed may be operated off of any standard commercial circuit as for example, the normal lighting circuits and the equipment is simple, readily obtainable and inexpensive.

It is a fact that very large financial wastes occur continuously owing to the lack of means of controlling the concentration of such materials as dyes in the solution, wood, pulp in the solution, amount of paint or pigma applied to cloth, paper, etc., and other similar cases.

The application of this equipment to the control of combustion in furnaces as for example in the producing of steam under boilers is evident. In this case, the example of the products of combustion from the furnace is passed continuously through container 18 and balanced against a desired standard in container 17. In case the opaqueness of the gases in container 18 increases, the mechanism causes automatic valve mechanism 46 to operate which would open the damper increasing the amount of air delivered to the furnace, thus reducing the smoke.

In Figure 5 I have shown a modified arrangement of equipment to accomplish a similar purpose to that shown in Figure 1. Referring to Figure 5, 60 indicates a source of light as for example, an ordinary incandescent lamp. The light passes from the filament or lamp 60 through a controlled opening in screen 61 to a mirror 62 located on a vibrating member 63. Member 63 may be constructed in any desired manner as for example, a rugged steel spring securely fastended at one end 64 and provided with an adjustable rider 65 arranged to control the period of vibration of member 63. The mirror 62 may be in the form of a prism or any desired reflecting surface. Vibrating member 63 is maintained in vibration during the operation of the device by an alternating current coil 66, actuated from a source of potential applied to terminals 67 and 68. Light rays which fall on mirror 62 are reflected to a second mirror 69 and as vibrating member 63 travels the light is passed alternately through container 70 and container 71 which represent respectively, the standard sample and the material being tested and controlled. Light ray passing through containers 70 and 71 fall on mirrors 72 and 73 respectively, and are reflected to photo-electric cell 74 in the manner previously described. The terminals of photo-electric cell 74 are connected in series with a variable resistance 75 and a source of rectified current later to be described. One terminal of photo-electric cell 74 is connected to grid member 76 of three electrode tube 77 while the other terminal of photo-electric cell 74 is connected to the filament 78 of tube 77. Filament 78 is connected in series with a coil 79, of a transformer 81 and a variable resistance 80 arranged to control the amount of current and therefore the temperature of filament 78.

Transformer 81 is connected with its primary terminals to 67 and 68. Coils 79 serves as one secondary winding for transformer 81 and coil 82 serves as another secondary winding. A sample rectifier such as a vacuum tube 83 is connected in series with the terminals of coil 82 and serves as a source of potential for photo-electric cell 74 as previously described and a source of potential to be applied between plate 84 of tube 77 and filament 78. A variable impedance 85 is placed in series with this circuit the terminals of which are connected to coil 86 around core 87 of a relay member. Coil 88 is wound around core 87 and connected to secondary winding 82 of transformer 81 in such a manner that the rectified current delivered to coil 88 produces normally a magnetizing effect approximately equal and opposite to that produced by coil 86 when actuated by the amplified photo-electric current of cell 74 under the influence of light rays traveling through tube 70. Obviously, proper balance under these conditions may be obtained by the adjustment of the variable impedances mentioned including variable impedance 90 in series with coil 88.

It will be apparent that as long as the effect on cell 74 by light rays traveling through container 71 is the same as the effect by light rays traveling through container 70, that the magnetizing changes acting on core 87 of the relay will remain balanced and the relay will remain open. As soon, however, as the intensity of light traveling through the two containers 70 and 71 is different, the magnetizing effects of coils 88 and 86 on core 87 will vary in the manner previously outlined and diagrammatically illustrated in Figures 3 and 4. Under these conditions the core 87 will attract core 91, closing contacts 92 and 93 and applying the potential from terminals 67 and 68 upon the desired automatic control equipment indicated diagrammatically by the rectangle 94. Automatic control equipment 94 may be employed as previously explained and described to open valves, close dampers, or perform other control operations.

Obviously the arrangement of equipment shown and described in connection with Figure 5, would be understood as diagrammatic and subject to many obvious modifications without departing from the scope of this invention.

The arrangement shown in Figure 6 illustrates another alternate form of my invention. In Figure 6 a ray of light indicated as 100 is directed upon a reflector 101. Reflector 101 is supported by vibrating member 102 which is fastened at one point to supporting member 103. An alternating current electro-magnet 104 is energized by terminals 105 and 106 and causes vibrating member 102 to oscillate continuously.

Vibrating member 102 carries contacts 107 and 108 arranged to close circuits respectively through windings 109 and 110 as member 102 vibrates.

The material whose density is being controlled is illustrated diagrammatically as being within container 111 while a standard used for comparison purposes is held within container 112.

Mirrors 113 and 114 respectively direct the beam from ray 100 successively through containers 111 and 112 as member 102 oscillates.

Mirrors 115 and 116 are arranged to reflect the beam of light after traveling through containers 112 and 111 respectively, to light sensitive cell 117.

Light sensitive cell 117 is connected in series with a source of current 118 and the grid 119 of a three-electrode tube 120. Tube 120 is used to amplify the currents produced in light sensitive cell 117. Obviously any other equivalent amplifying means could be employed. Tube 120 is provided with filament 121 actuated from a source of current 122. A plate member 123 in tube 120 serves to receive the amplified electrical impulses which are originated in light sensitive cell 117. The circuit from plate 123 includes filament 121, a source of current 124 vibrating member 102, and alternately contacts 107 and 108, and the respective windings 109 and 110. Windings 109 and 110 are equal in the number of turns, but opposite in direction. Core 124 is arranged to actuate armature 126 when the magnetic effect of windings 109 and 110 is not balanced. When armature 126 is attracted by core 125 contact 127 is closed, thus actuating automatic valve or other control mechanism 128 by source of current 129. Obviously one or all of the sources of current mentioned in this description may be combined, individual sources of current being shown in order to clarify the description of the equipment. The operation of the arrangement of equipment shown in Figure 6 is as follows:

Vibrating member 102 is maintained in synchronous vibration by magnet member 104 or any other suitable means.

As a result of the vibration of member 102 light ray 100 is successively deflected through container 111 and container 112 being alternately directed upon photo-electric cell 117. Photo-electric cell 117 therefore alternately permits a current to flow in the circuit of the grid member 119. The current flowing in grid member 119 will be proportional to the intensity of the rays of light passing through containers 111 and 112, and if the density of the material in containers 111 and 112 is such that the light absorption in each case is identical, the currents flowing in the grid circuit 119 will be equal for each impulse.

These currents will successively pass through windings 109 and 110 under the influence of current supply member 124.

When vibrating member 102 is at the upper portion of its travel, contact 107 will be closed permitting the current from plate circuit 123 to pass through coil 109. During this same interval, a light ray of 101 is deflected through container 111 so that the current flowing through coil 109 will be proportional to the opaquenes of material in container 111.

On the other hand when vibrating member 102 is at the lower portion of its stroke, contact 108 will be closed, thus permitting the current from plate member 123 to pass through coil 110, which, however, is wound in an opposite direction to coil 109. During this interval of time, light ray 100 is deflected through container 112 and the current passing through coil 110 is therefore proportional to the opaqueness of material in container 112. If the opaqueness of the materials in containers 111 and 112 is equal the currents passing through coils 109 and 110 will be equal and opposite and core 125 will be subjected to an alternating magnetic force which will not lift armature 126.

If, however, the opaqueness of material in containers 111 and 112 is not equal the currents which alternately pass through coils 110 and 109 will not be equal, and there will acordingly be a constant magnetic force on core 125 which will lift armature 126 thus closing contact 127 and actuating control member 128.

Now, therefore, if container 111 holds a continuously changing sample of the material whose density is to be controlled and container 112 represents a test standard or a comparison material, then the system described above will operate to vary the density of sample 111 as required to obtain a constant result. The operation of member 128 in obtaining a control may cover a wide range of equivalents such as has been previously described and explained.

It should be understood that in all cases where I oppose two varying currents as for example in coils 36—38, 86—88, 109—110, etc., the inertia or time lag of the equipment normally results in retarding the motion of the circuit closing device, so that the contacts of the circuit closing device do not chatter or vibrate excessively. The inertia which accomplishes this result may be physical, that is due to the delay in accelerating the circuit closing device, etc., it may be due to friction, or it may be of the nature of electrical or magnetic inertia of various parts of the equipment or circuit. The effect of the inertia is in fact so difficult to eliminate that it may be asumed to be present in nearly all practical devices when operating at high frequencies. Of course the inertia effect whether due to physical magnetic or electrical forces will increase, with increase in the frequency with which the electric currents are imposed on the circuit closing device.

It will be apparent that the system described in this specification is independent of such variables of applied potentials, deterioration of light source, change in activity of photo-electric cell, variation of amplifiers, etc. In other words the equipment which I have invented gives constant results under all practical commercial conditions and independently of the usual variables which are normally encountered.

Having now fully described my invention, what I claim as new and wish to secure by Letters Patent in the United States, is as follows:

1. The process of automatically maintaining a constant density of material by alternately passing a beam of light from a single source through a standard and through the material to be controlled, causing said beam of light to produce currents varying with the opaqueness of the materials, balancing said currents against constant synchronized opposing currents so arranged that a variation in the opaqueness of the material being controlled will unbalance said currents and thus actuate a device for correcting the density of said material being controlled.

2. A device for controlling the density of a medium consisting of a source of light, means for directing rays from said source of light succesively through a standard and said medium being controlled, light sensitive means actuated by said rays to produce a current varying with the opaqueness of said material being tested, a relay actuated by said varying currents, a winding on said relay actuated by a synchronized opposing current and a control equipment actuated by said relay for controlling the density of the material being tested.

3. In a device for automatically controlling materials, a device for successively deflecting a ray of light, a light sensitive relay and a control device actuated by said light sensitive relay.

4. In a process of automatically controlling the concentration of materials in solution, the step of passing a beam of light successively through a sample of material to be controlled and a standard sample, producing electrical forces proportional to the strength of said light rays, and balancing said electrical forces against synchronzied opposing electrical forces.

5. The process of automatically controlling the concentration of wood pulp in water which consists in passing a ray of light successively through a sample of material to be controlled, and a standard, causing said ray of light to actuate a light sensitive relay and causing said relay to increase the quantity of water mixed with said wood pulp.

6. In the process of controlling the concentration of a medium in a fluid, the step of passing a ray of light successively through the medium to be tested and a standard and balancing the effect produced by said ray of light after passing through said medium to be tested against the effect produced after passing through said standard.

7. The process of automatically controlling the concentration of material in solution by passing a light ray successively through the solution to be tested and a standard, balancing the photoelectric effect produced in each case one against the other, and causing the unbalanced component to operate a control device.

8. The process of controlling the opaqueness of a material which consists of first passing a light ray from a common source successively through the material being controlled and a standard material, second directing said light rays to cause the flow of current from a device, third balancing said currents thus produced respectively against a pair of synchronized opposing currents of fixed value, and finally causing an unbalance between said balancing currents and said light currents, to operate a control device for restoring uniform opaqueness.

9. The process of automatically controlling the opaqueness of a material by passing a ray of light successively through said material and a standard, causing the variation of the light ray thus passed to actuate a control device for automatically maintaining constant opaqueness.

10. The process of automatically controlling the concentration of material in suspension in a fluid by passing a ray of light successively through the stock to be tested and a standard agitated sample of stock, causing said light ray to actuate a light sensitive relay and causing said relay to actuate a control device for changing the concentration of material in suspension.

11. The process of automatically controlling the concentration of pulp in suspension in a fluid by passing a ray of light successively through said stock to be tested and a standard sample of stock, causing said light ray to actuate a light sensitive relay, and causing said relay to actuate a control device for changing the concentration of the material in suspension.

12. A device for automatically controlling materials comprising a light source, a light deflecting device, a light sensitive device, a relay device and a control mechanism actuated by differences in light intensity from said light deflecting device.

13. A device for automatically controlling materials consisting of a synchronized light deflecting device, a light sensitive device, and a control mechanism actuated by difference in light intensity from said synchronized light deflecting device.

14. A device for automatically controlling the concentration of materials suspended in a fluid, consisting of a light producing device, a moving light deflecting device, a light sensitive relay, amplifying means, and a mechanism actuated from said light sensitive relay for automatically changing the concentration of said material.

15. A process for automatically controlling the properties of a material including the steps of passing a beam of light successively through the material and a standard, and utilizing the unbalanced component of the light rays for operating a control device for said material.

16. In the process of automatically controlling properties of materials by their light transmission, the step of passing a beam of light successively through the material to be controlled and a standard.

17. A process for automatically controlling properties of materials by their light transmission, including the steps of passing a beam of light successively through the material being controlled and a standard, and utilizing the resultant differential for controlling the properties of said material.

18. In a process for controlling the properties of materials by their light transmission, the step of intermittently checking the light transmission of the material being controlled with a standard.

19. In a measuring or controlling device, a photo-electric cell subject to variations in its current response for light rays of a given intensity, in combination, automatic operating means to compensate for said variations in the current response of said cell.

20. In a measuring or controlling device, a photo-electric cell subject to variations in its current response for light rays of a given intensity, a current responsive device connected with the cell, and automatic operating means whereby said variations in the response current of the cell will be compensated in the operation of said current responsive device.

21. An apparatus for automatically controlling materials by their light transmission comprising a source of light, a means for supplying impulse current, a combined light ray deflecting device and current impulse control, a light sensitive cell and a material in the path of deflected rays, and means for utilizing the current impulses from the current impulse control and the cell for controlling said material.

22. An apparatus for automatically controlling materials by their light transmission comprising a source of light, a means for supply impulse current, a light ray, a synchronously operated light ray deflecting device and current impulse control, a light sensitive cell and a material in the path of the deflected rays, and means for utilizing the current impulses from the current impulse control and the current impulses from the cell for controlling the material.

23. In a measuring or controlling equipment employing a source of light, a light sensitive cell, and electrical devices responsive to currents from the light sensitive cell, in combination, automatic operating means for checking each measuring or controlling operation of the equipment.

24. In a measuring or controlling equipment employing a source of light, a light sensitive cell, and electrical devices responsive to currents from the light sensitive cell, in combination, automatic operating means for checking each measuring or controlling operation of the equipment and/or compensating for variables in the equipment for each measuring or controlling operation thereof.

25. In combination, a light source, a light sensitive cell, a multiple of light paths by which light from said source may reach said cell, electrical operated equipment responsive to the current from said cell, and automatic means for intermittently subjecting said cell to light rays from each of said multiple of light paths.

26. In combination, a light source, a light sensitive cell, a multiple of light paths by which light from said source may reach said cell, one of said paths being adapted to limit the light rays reaching said cell to substantially constant intensity, electrically operated equipment responsive to the current from said cell, and automatic means for intermittently subjecting said cell to light rays from each of said multiple of light paths.

27. In a controlling or measuring device, a light sensitive cell, means for causing the cell to respond to rays of light of known intensity for each response thereof to the light rays being controlled or measured, and means for balancing the resultant current responses of said cell against each other.

28. In a controlling or measuring device, a light source, a light sensitive cell, a pair of paths by which light from said source may reach said cell, automatic operating means for alternately subjecting said cell to light rays from said light paths, and electrically operated devices connected to the cell and responsive to the currents therefrom for effecting the measuring or controlling operations of said equipment.

29. In a controlling or measuring device, a light source, a light sensitive cell, a plurality of paths by which light from said source may reach said cell, automatic operating means for subjecting said cell at different intervals to light rays from each of said paths, and electrically operated devices connected to said cell and responsive to the current thereof for effecting the controlling or measuring operations of said equipment.

30. In a controlling or measuring device, a light source, a light sensitive cell, a plurality of paths by which light from said source may reach said cell, at least one of said paths being adapted to limit the light rays reaching the cell to substantially constant intensity, automatic operating means for subjecting said cell at different intervals to light rays from each of said paths, and electrically operated devices connected to said cell and responsive to the current thereof for effecting the controlling or measuring operations of said equipment.

31. In a controlling or measuring device, a light source, a light sensitive cell, a plurality of paths by which light from said source may reach said cell, automatic operating means for subjecting said cell at different intervals to light rays from each of said paths, and electrically operated devices connected to said cell and adapted for combining current impulses from said cell and effecting the controlling or measuring operations of said equipment therewith.

32. In a measuring or controlling equipment employing a source of light, and a light sensitive cell, in combination, automatic operating means for causing the light sensitive cell to emit a checking current impulse for each measuring or controlling current impulse, and electrically operated devices connected to the cell and adapted to effect the measuring or controlling operations of said equipment in accordance with said cell current impulses.

33. In a measuring or controlling equipment employing a source of light, and a light sensitive cell, in combination, automatic operating means for causing the light sensitive cell to emit a checking current impulse for each measuring or controlling current impulse, and electrically operated devices connected to said cell adapted to combine the current impulses from said cell and utilize the combined current impulses for effecting the measuring or controlling operations of said equipment.

WILLIAM A. DARRAH.